United States Patent
Schroeder

[11] 3,827,496
[45] Aug. 6, 1974

[54] HIGH WATER CONTENT MICELLAR SOLUTION CONTAINING THICKENERS

[75] Inventor: Donald E. Schroeder, Littleton, Colo.

[73] Assignee: Marathon Oil Company, Findlay, Ohio

[22] Filed: Feb. 23, 1973

[21] Appl. No.: 335,187

[52] U.S. Cl.............................. 166/273, 166/274
[51] Int. Cl.......................................... E21b 43/22
[58] Field of Search................... 166/273–275, 166/305 R; 252/8.55 D

[56] References Cited
UNITED STATES PATENTS

| | | | |
|---|---|---|---|
| 3,070,158 | 12/1962 | Roper et al.................. | 166/275 |
| 3,288,213 | 11/1966 | King et al. ................ | 166/274 |
| 3,302,713 | 2/1967 | Ahearn et al............... | 166/274 |
| 3,330,344 | 7/1967 | Reisberg..................... | 166/274 |
| 3,348,611 | 10/1967 | Reisberg..................... | 166/274 X |
| 3,500,923 | 3/1970 | Reisberg..................... | 166/274 |
| 3,506,070 | 4/1970 | Jones........................... | 166/274 X |
| 3,506,071 | 4/1970 | Jones........................... | 166/274 X |
| 3,532,166 | 10/1970 | Williams...................... | 166/274 |
| 3,770,056 | 11/1973 | Campbell et al............. | 166/273 |

Primary Examiner—Stephen J. Novosad
Attorney, Agent, or Firm—Joseph C. Herring; Richard C. Willson, Jr.; Jack L. Hummel

[57] ABSTRACT

Improved oil recoveries with water-external micellar solutions are obtained by flooding with a micellar solution containing water, a viscosity-increasing agent dissolved in the water, hydrocarbon, and monovalent cation-containing petroleum sulfonate(s) having an average equivalent weight within the range of about 300–525 and being present in concentrations at least five times the CMC (critical micelle concentration) within the particular micellar solution. Optionally cosurfactant and/or electrolyte can be present. The micellar solution can be followed by an aqueous mobility buffer and the buffer followed by a waterdrive. The micellar solution is displaced toward a production well to recover crude oil therethrough.

10 Claims, 1 Drawing Figure

OIL RECOVERY VS -SO$_3$NH$_4$ CONCENTRATION MICELLAR SOLUTION

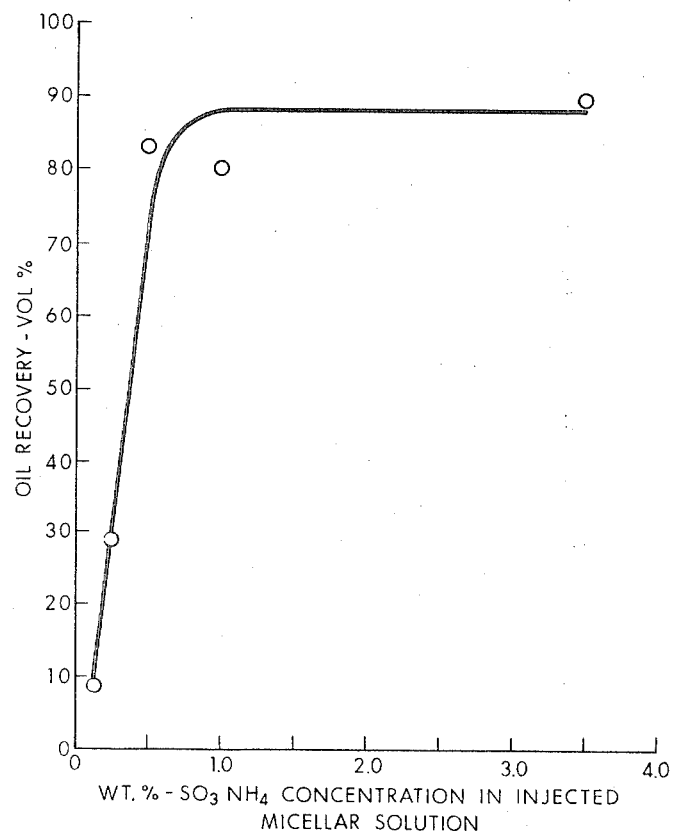
OIL RECOVERY VS -SO$_3$NH$_4$ CONCENTRATION
MICELLAR SOLUTION

3,827,496

HIGH WATER CONTENT MICELLAR SOLUTION CONTAINING THICKENERS

BACKGROUND OF THE INVENTION

1. Field of the Invention

This invention relates to injecting a displacing fluid into an oil-bearing subterranean reservoir and displacing it toward a production well in fluid communication with the reservoir to recover crude oil. A water-external micellar solution containing a viscosity increasing agent is used.

2. Description of the Prior Art

Immiscible flooding of oil from subterranean reservoirs has been practiced for many years. This process has proved to be successful but there is a limit of how much oil can be recovered. More specifically, after residual oil saturation is obtained, no more oil can be recovered by this process.

To recover additional crude oil, the prior art has added chemicals, e.g. surfactants, to the waterflood to reduce the interfacial tension between the water and the residual oil. Both water-external and oil-external emulsions, oil-external and water-external micellar solutions, aqueous alcohol floods, miscible hydrocarbon floods, and like processes have been used. Examples of patents which teach the above processes include:

U.S. Pat. No. 3,170,514 to Harvey et al improves waterflooding by incorporating within the waterflood sodium dodecyl sulfate and calcium dodecyl sulfate above the CMC.

U.S. Pat. No. 3,288,213 to King improves waterflooding by incorporating up to 10 percent of a surfactant in the waterflood, the surfactant has an HLB (hydrophil-lipophil balance) about equal to that of the crude oil/injection water system. The surfactant can be petroleum sulfonate, examples include both water-soluble and oil-soluble sulfonates and mixtures thereof.

U.S. Pat. No. 3,302,713 to Ahearn et al floods with an aqueous surfactant system containing 0.01–5 percent by weight of a petroleum sulfonate obtained by neutralizing the sulfonic acids obtained by sulfonating hydrocarbons having a boiling point range of about 700°–1,100° F. Salt, as well as water-soluble thickeners, e.g. polyacrylamides, polyacrylates, sulfonated vinyl aromatic polymers, biopolymers, can be added to the aqueous surfactant system. Sodium monosulfonates having molecular weights of 450–700 are useful with this invention. The salt improves the surface activity of the water sulfonate mixture.

U.S. Pat. No. 3,330,344 to Reisberg uses water-external micellar dispersions to improve oil recovery. The micellar dispersion contains a cationic, nonionic or anionic surfactant and an amphiphilic coupling agent, e.g. higher molecular weight monohydroxy aliphatic and alicyclic alcohols having low water solubility. The surfactant is preferably present in concentrations at least equal to the CMC. Examples of surfactants include the soaps of fatty acids, soaps of mixed organic acids, the petroleum naphthenic acids, surface active organic sulfonates and sulfonic acid salts.

U.S. Pat. No. 3,348,611 to Reisberg recovers oil by displacing it with an aqueous surfactant solution containing salts. The surfactant is a mixture of an oil-soluble high molecular weight alkyl aryl sulfonate and a water-soluble lower molecular weight alkyl aryl sulfonate. The aqueous slug contains 0.1–5 percent by weight of the oil-soluble sulfonate and at least the CMC of the water-soluble sulfonate. The salt of the electrolyte is added to the aqueous surfactant mixture to swell the micelles.

U.S. Pat. No. 3,506,070 and U.S. Pat. No. 3,506,071 to Jones teach the use of water-external micellar dispersions to recover crude oil. The micellar dispersions contain at least 4 percent petroleum sulfonate, the petroleum sulfonate can be 60 percent active sulfonate. The micellar dispersion contains water, hydrocarbon, and petroleum sulfonate and optionally cosurfactant (preferably alcohol) and/or electrolyte (preferably inorganic salt, inorganic base or inorganic acid). The unreacted hydrocarbon within the petroleum sulfonate can be used as the hydrocarbon within the micellar dispersion. Average molecular weight of the petroleum sulfonate is about 360–520. About 1–20 percent formation pore volume of the micellar dispersion is useful to recover oil and this is preferably followed by 5–75 percent formation pore volume of the mobility buffer (preferably water containing a high molecular weight polyelectrolyte).

SUMMARY OF THE INVENTION

Applicant has discovered that improved oil recoveries with water-external micellar solutions can be obtained by incorporating within the micellar solution at least five times the critical micelle concentration of petroleum sulfonate(s) and also by including a viscosity increasing agent within the micellar solution. Optionally, an aqueous mobility buffer can be injected behind the micellar solution and the combination displaced, preferably with drive water, toward a production well in fluid communication with the reservoir. Polyelectrolytes and biopolymers are the preferred viscosity increasing agents.

DESCRIPTION OF THE DRAWING

The graph shows the relationship of oil recovery vs. sulfonate concentration. The total amount of $-SO_3NH_4$ injected in all cases is held constant but the $-SO_3NH_4$ concentration is varied, i.e., the total pore volume of injected micellar solution is varied. The CMC is a function of the hydrocarbon portion of the petroleum sulfonate as well as the position and number of $-SO_3NH_4$ groups. From a practical basis, the CMC can be expressed as a function of the sulfonate groupings within the micellar solution. The $-SO_3NH_4$ concentration is plotted vs. the volume percent oil recovery obtained in flooding Berea sandstone cores. As the graph indicates, there is a definite influence on the oil recovery at concentrations above 0.5 weight percent $-SO_3NH_4$ groupings in the micellar solution—the CMC for this micellar solution is about 0.1 weight percent. Specific details of the flooding to obtain these data are discussed in the examples.

DESCRIPTION OF PREFERRED EMBODIMENTS OF INVENTION

The micellar solution applicable with this invention is water-external. That is, the water phase is external to the dispersed hydrocarbon phase. The micellar solution contains water, hydrocarbon, petroleum sulfonate, a viscosity increasing agent dissolved in the water and optionally, but preferably, cosurfactant and/or electrolyte. The micellar solution is preferably followed by a mobility buffer which is water containing a mobility reducing agent. A water drive is injected after the micellar solution to displace the micellar solution toward the production well to recover crude oil therethrough.

The water-external micellar solution contains, on a volume basis, about 80 to about 98 percent and preferably about 85 to about 96 percent and more preferably about 90 to about 95 percent water, about 0.2 to about 10 percent and preferably about 1.6 to about 6 percent of hydrocarbon, at least about five times the CMC of an alkali metal or ammonium petroleum sulfonate, about 25 to about 3,000 ppm and preferably about 75 to about 2,000 and more preferably about 100 to about 1,500 ppm, based on the water, of a viscosity increasing agent, and optionally about 0.01 to about 20 percent and preferably about 0.1 to about 5 percent of a cosurfactant and/or about 0.001 to about 5 percent and preferably 0.01 to about 3 percent and more preferably about 0.1 to about 2.5 percent by weight, based on the aqueous medium, of an electrolyte.

The water can be a soft water, a brackish water, or a brine but it should not contain appreciable amounts of divalent cations. The water is preferably soft water where it is desired to obtain the maximum viscosity of the micellar solution. Also, where the water contains electrolyte, it is preferred that the electrolyte be compatible with the salts within the formation fluids of the reservoir being flooded.

The petroleum sulfonate contains alkali metal and/or ammonium cation. The average equivalent weight of the petroleum sulfonate is preferably within the range of about 300 to about 525 and more preferably about 350 to about 470 and most preferably about 375 to about 450. The petroleum sulfonate can be a monosulfonate or polysulfonate or combination thereof. The petroleum sulfonate can contain unsulfonatable or unreacted hydrocarbon, salts as by-products from the sulfonation reaction or any other type of by-product from the sulfonation reaction. The sulfonate product can contain at least about 10 percent and more preferably at least about 50 percent of active sulfonate. The unsulfonatable hydrocarbon within the sulfonate can be used as the hydrocarbon within the micellar solution. The petroleum sulfonate can be a mixture of low, medium, and high average equivalent weight petroleum sulfonates and mixtures of different cation-containing sulfonates. As mentioned earlier, the petroleum sulfonate is present in concentrations of at least five times the CMC and more preferably at least about eight times the CMC.

The hydrocarbon useful in the micellar solution can be crude oil, both sweet and sour, partially refined fractions of crude oil such as gas oils, kerosene, heavy naphthas, naphthas, straight-run gasoline, liquefied petroleum gases, and other streams taken during fractionation of the crude oil. Also, the hydrocarbon can be a refined fraction of crude oil such as propane, butane, heptane, decane, dodecane, cyclohexane, benzene, toluene, xylene, propylene, butylene, jet fuel, "finished" gasoline, etc. Also, the hydrocarbon can be a synthesized hydrocarbon such as halogenated hydrocarbons, substituted aromatic compounds, substituted paraffinic compounds, etc. In general, any hydrocarbon is useful with the micellar solution as long as it is compatible with the other components making up the micellar solution. Also, it is desirable that the hydrocarbon be compatible with the reservoir and the formation fluids within the reservoir being flooded. As mentioned earlier, unsulfonated hydrocarbon within the petroleum sulfonate is useful as the hydrocarbon.

The cosurfactant is also identified as a semi-polar organic compound or a cosolubilizer. Preferably, the cosurfactant has limited water solubility, e.g. about 20 percent or less at about 23° C. Examples of cosurfactants include alcohols, amides, esters, aldehydes, ketones and organic compounds containing one or more of hydroxy, oxy, amide, or like functional groups and wherein the cosurfactant contains one to about 20 or more and preferably about three to about 16 carbon atoms. Examples of preferred cosurfactants include isopropanol, n- and i-butanol, amyl alcohols such as n-amyl alcohol, 1- and 2-hexanol, 1- and 2-octanol, decyl alcohols, alkaryl alcohols such as p-nonyl phenol, unrefined hydroxy (includes polyhydroxy) streams, and alcoholic liquors such as fusel oil. In general, the primary, secondary, are preferred with the invention. Mixtures of two or more cosurfactants are useful.

The electrolyte is preferably an inorganic salt, inorganic base, or inorganic acid, but can be an organic salt, organic base, or organic acid or mixtures thereof. Examples of electrolytes include sodium hydroxide, sodium chloride, sodium sulfate, sodium sulfite, ammonium chloride, ammonium sulfate, ammonium sulfite, hydrochloric acid, sulfuric acid, sulfurous acid, sodium nitrate, ammonium chloride, ammonium hydroxide, potassium chloride, et al. The salt present in the petroleum sulfonate is useful as the electrolyte within the micellar solution.

The viscosity increasing agent useful in the micellar solution should, of course, be compatible with other components of the micellar solution. The agent is dissolved in the water phase and should impart increased apparent viscosity to the water phase of the micellar solution. In general, the viscosity increasing agent can be a high molecular weight synthetic organic polymer or biopolymer or modified biopolymer. The high molecular weight organic polymer can be obtained by polymerizing ethylenically unsaturated carboxylic acids or alkali metal salts thereof and/or ethylenically unsaturated noncarboxylic monomers. The polymer can be a homopolymer, copolymer, terpolymer, etc. Examples of preferred viscosity increasing agents include acrylamide polymers and partially hydrolyzed acrylamide polymers such as the Pusher polymers—Pusher is a trademark of Dow Chemical Company, Midland, Michigan. Copolymers containing acrylamide and acrylic acid or alkali metal salts thereof or partially hydrolyzed products thereof are also useful—examples of such polymers include those marketed by Betz Laboratories, Trevose, Pa., 19047, specific examples include the Betz UniPerm and Betz HiVis Polymers; Nalco Chemical Company, Petroleum Division, 1800 Esperson Building, Houston, Texas 770002; Calgon Corporation, Pittsburgh, Pennsylvania 15230. Patents which teach useful polymers include U.S. Pat. No. 2,341,500 to Detling, U.S. Pat. No. 2,771,138 to Beeson, U.S. Pat. No. 2,842,492 to Engelhardt et al., U.S. Pat. No. 3,002,960 to Kolodny, U.S. Pat. No. 3,020,953 to Zerweck et al., U.S. Pat. No. 3,025,237 to Roper, U.S. Pat. No. 3,070,158 to Roper, Canadian Pat. No. 683,476 to Seigel et al., U.S. Pat. No. 2,827,964 to Sandiford et al., U.S. Pat. No. 3,039,529 to McKennon, and U.S. Pat. No. 3,679,000 to Kaufman, etc. The biopolymer can be a polysaccharide or a chemically modified product thereof. An especially useful biopolymer is the Kelzan polymer, marketed by Kelco, a division of Xanco, 3501 W. Alabama Street, Houston, Texas, 77027. The viscosity increasing agent preferably has a molecular weight greater than 1,000,000 and preferably greater than 10,000,000. In general, any agent which will effectively increase the apparent viscosity of the water and which is compatible with other components present in the micellar solution is useful with this invention.

Other components can be present in the micellar solution, e.g. oxidation and corrosion inhibitors, bactericides, oxygen scavenging agents, etc. In general, any agent which is compatible with the micellar solution can be included within the micellar solution.

Formation pore volumes of about 1 to about 100 percent and preferably about 5 to about 80 percent and more preferably about 10 to about 50 percent are especially useful. The water-external micellar solution is injected into the oil-bearing subterranean reservoir through an injection means and displaced toward a production means in fluid communication with the reservoir. Crude oil is recovered through the production means. The injection means and the production means can have a common well but preferably the production means and the injection means are separate wells.

A mobility buffer is preferably injected behind the micellar solution. The mobility buffer is preferably an aqueous solution containing a mobility reducing agent. The mobility reducing agent can be identical to the viscosity increasing agent as identified below. Preferably the mobility reducing agent is a high molecular weight polyelectrolyte or biopolymer. The agent can be a homopolymer, copolymer, terpolymer, or like polymer containing one or more of ethylenically unsaturated carboxylic acid or alkali metal salt thereof and/or ethylenically unsaturated noncarboxylic monomer. Examples of preferred mobility reducing agents include those defined in U.S. Pat. No. 3,039,529 to McKennon, U.S. Pat. No. 2,827,964 to Sandiford et al., and U.S. Pat. No. 3,679,000 to Kaufman. In general, any mobility reducing agent that is soluble in water and will effectively reduce the mobility of the mobility buffer as it flows through the reservoir rock is useful with this invention. The mobility reducing agent is preferably compatible with the reservoir and the formation fluids and more preferably is compatible with the fluids which precede or follow the mobility buffer; that is, at the juncture of the preceding or following slugs.

Volume amounts of the mobility buffer slug useful with this invention include about 5 percent to about 100 percent and more preferably about 10 to about 90 percent and most preferably about 15 to about 80 percent formation pore volume. The mobility reducing agent can be present in concentrations of about 25 to about 3,000 ppm, preferably about 75 to about 2,000 ppm and more preferably about 100 to about 1,500 ppm. The front portion of the mobility buffer can be "spiked," i.e., contain a larger concentration of the mobility reducing agent as compared to the latter portions of the mobility buffer. Methods of designing the mobility buffer slug are known in the art, e.g. U.S. Pat. No. 3,467,187 to Gogarty et al. The mobility buffer can contain additives to impart desired properties, e.g. can contain a bactericide, corrosion inhibitor, oxygen scavenging agent, etc. The front portion of the mobility buffer can contain cosurfactants, surfactants, electrolyte, and other components—these components are preferably present in sufficient concentrations to obtain an equilibrium with like or similar components within the back portion of the micellar solution. The latter is preferred to prevent the mobility buffer from "leaching" components out of the back portion of the micellar solution.

A drive water or equivalent drive fluid is injected to displace the micellar solution and/or the mobility buffer toward the production means. The water is preferably compatible with the reservoir rock as well as with the formation fluids within the reservoir.

EXAMPLES

The following examples are presented to teach specific working embodiments of the invention. Unless otherwise specified, all percents are based on weight.

Berea sandstone cores 4 feet long and 3 inches in diameter are first cleaned and dried and are then flooded with water containing about 20,000 ppm of TDS (total dissolved solids). Thereafter, the cores are flooded with oil having a viscosity of about 7 cp. at 23° C. and are then flooded to residual oil saturation with water containing about 20,000 ppm of TDS. The cores are now in condition for a tertiary flood.

Permeabilities of the cores are indicated in Table 1.

The cores are flooded with water-external micellar solutions identified in Table 1. The petroleum sulfonate contains 17 weight percent unsulfonated hydrocarbon, 21 weight percent $RSO_3NH_4$ and the CMC of this sulfonate in this micellar solution is about 0.1 weight percent based on $-SO_3NH_4$ groups. The micellar solutions are followed by mobility buffer slugs composed of water containing about 400 ppm of TDS, the composition and amounts of the buffer slugs are:

| | |
|---|---|
| Runs A–L: | 100% PV (pore volume) of 1000 ppm Pusher polymer 700 |
| Run M: | 46% PV of 550 ppm Kelzan MF biopolymer |
| Run N: | 46% PV of 1000 ppm Kelzan MF biopolymer |
| Run O: | 46% PV of 1750 ppm Kelzan MF biopolymer |
| Run P: | 10% PV of 1300 ppm Nalco copolymer followed by 36% PV of 300 ppm Nalco copolymer |
| Run Q: | same as "Run P" except 36% PV of 430 Nalco copolymer |
| Run R: | 10% PV of 1000 ppm Nalco copolymer followed by 36% PV of 120 ppm Nalco copolymer |
| Run S: | 10% PV of 1000 ppm Nalco copolymer followed by 36% PV of 430 ppm Nalco copolymer |
| Run T: | 10% PV of 1000 ppm Nalco copolymer and 5,000 ppm NaCl followed by 36% PV of 120 ppm Nalco copolymer |
| Run U: | 10% PV of 1300 ppm Nalco copolymer followed by 50% PV of 325 ppm Nalco copolymer |
| Run V: | 10% PV of 1000 ppm Betz polymer followed by 36% PV of 120 ppm Betz polymer |

TABLE 1

OIL RECOVERY EFFICIENCY OF SULFONATE SLUGS

| Run No. | Slug Data Composition Weight % | | | | | | % PV of Micellar Solution Injected | Core Permeability | Volume % Oil Recovery |
|---|---|---|---|---|---|---|---|---|---|
| | —SO₃NH₄ | Salt | Water | Hydrocarbon | Viscosity Increasing agent | | | | |
| A | 2.0 | 2.0 | 81.3 | 8.7 | none | | 7.0 | 824 | 55.5 |
| B | 2.0 | 2.0 | 81.2 | 8.7 | Kelzan MF | 0.100 | 7.0 | 786 | 63.3 |
| C | 2.0 | 2.0 | 81.1 | 8.7 | do. | 0.165 | 7.0 | 722 | 89.5 |
| D | 2.0 | 2.0 | 81.1 | 8.7 | do. | 0.165 | 7.4 | 759 | 81.8 |
| E | 1.0 | 1.0 | 90.7 | 4.3 | do. | 0.050 | 14.0 | 786 | 79.6 |
| F | 1.0 | 1.0 | 90.6 | 4.3 | do. | 0.100 | 14.0 | 830 | 91.3 |
| G | 0.5 | 0.5 | 95.9 | 1.6 | do. | 0.025 | 28.0 | 835 | 82.3 |
| H | 0.5 | 0.5 | 95.9 | 1.6 | do. | 0.050 | 28.0 | 742 | 83.7 |
| I | 0.25 | 0.25 | 97.9 | 0.8 | do. | 0.25 | 56.0 | 685 | 29.9 |
| J | 0.25 | 0.25 | 97.9 | 0.8 | do. | 0.050 | 56.0 | 734 | 28.7 |
| K | 0.125 | 0.125 | 99.0 | 0.4 | do. | 0.025 | 112.0 | 862 | 6.5 |
| L | 0.125 | 0.125 | 99.0 | 0.4 | do. | 0.050 | 112.0 | 809 | 8.7 |
| M | 0.5 | 0.5 | 95.9 | 1.6 | do. | 0.050 | 28.0 | 534 | 78.6 |
| N | 0.5 | 0.5 | 95.8 | 1.6 | do. | 0.085 | 28.0 | 738 | 78.2 |
| O | 0.5 | 0.5 | 95.8 | 1.6 | do. | 0.100 | 28.0 | 156 | 63.9 |
| P | 0.5 | 0.5 | 95.8 | 1.6 | do. | 0.100 | 28.0 | 159 | 85.3 |
| Q | 0.5 | 0.5 | 95.9 | 1.6 | Nalco | 0.030 | 28.0 | 82 | 88.3 |
| R | 0.5 | 0.5 | 95.9 | 1.6 | do. | 0.030 | 28.0 | 97 | 83.9 |
| S | 0.5 | 0.5 | 95.9 | 1.6 | do. | 0.030 | 14.0 | 163 | 62.1 |
| T | 0.5 | 0.5 | 95.9 | 1.6 | Nalco | 0.030 | 28.0 | 129 | 82.4 |
| U | 1.0 | 1.0 | 91.7 | 3.2 | Nalco | 0.060 | 14.0 | 125 | 70.2 |
| V | 0.5 | 0.5 | 95.9 | 1.6 | Betz | 0.030 | 28.0 | 170 | 93.7 |

From the above data, it is apparent that the preferred concentration of the petroleum sulfonate in the micellar solution and the viscosity increasing agent within the water phase of the micellar solution obtains increased oil recoveries. That is, as compared to those micellar solutions containing less than the five times the CMC ratio, improved oil recoveries are obtained.

It is not intended that this invention be limited by the specifics taught above. Rather, the invention should be interpreted in view of the prior art equivalents as applied to the scope of the invention as defined in the specification and appended claims.

What is claimed is:

1. An improved process of recovering oil from an oil-bearing subterranean formation wherein a water-external micellar solution containing water, petroleum sulfonate and hydrocarbon is injected into the formation and displaced toward a production means to recover crude oil therethrough, the steps comprising injecting into the formation a micellar solution comprised of about 0.2 to about 10 percent by volume hydrocarbon, about 80 percent to about 98 percent by volume water, at least about five times the CMC of an alkali metal and/or ammonium petroleum sulfonate(s) having an average equivalent weight within the range of about 300 to about 525, about 25 to about 3,000 ppm, based on the water, of a viscosity-increasing agent dissolved in the water phase, and thereafter displacing the micellar solution toward the production means to recover crude oil therethrough.

2. The process of claim 1 wherein the petroleum sulfonate is present in concentrations of at least eight times the CMC of the petroleum sulfonate within the micellar solution.

3. The process of claim 1 wherein the viscosity increasing agent is a high molecular weight synthetic organic polymer.

4. The process of claim 1 wherein the viscosity increasing agent is a high molecular weight biopolymer or chemically modified biopolymer.

5. The process of claim 1 wherein the viscosity increasing agent is a homopolymer or copolymer containing acrylamide, and has a molecular weight greater than about 1,000,000.

6. The process of claim 1 wherein the average equivalent weight of the petroleum sulfonate is about 350 to about 470.

7. The process of claim 1 wherein an aqueous mobility buffer slug is injected behind the micellar solution.

8. The process of claim 1 wherein a water drive is injected into the formation to displace the micellar solution toward the production means.

9. The process of claim 1 wherein the water phase of the micellar solution contains about 75 to about 2,000 ppm of a high molecular weight synthetic organic polymer or biopolymer.

10. The process of claim 1 wherein the micellar solution contains about 0.01 to about 20 percent by volume of a cosurfactant and/or about 0.001 to about 5 percent by weight, based on the water, of an electrolyte.

* * * * *